March 6, 1934.  E. A. AVERILL  1,949,855
WEIGHING DEVICE
Filed April 18, 1930  3 Sheets-Sheet 1

INVENTOR
Earl A. Averill,
BY
ATTORNEY

March 6, 1934.　　　E. A. AVERILL　　　1,949,855
WEIGHING DEVICE
Filed April 18, 1930　　　3 Sheets-Sheet 2

INVENTOR
*Earl A. Averill,*
BY
ATTORNEY

March 6, 1934.   E. A. AVERILL   1,949,855
WEIGHING DEVICE
Filed April 18, 1930   3 Sheets-Sheet 3

INVENTOR
Earl A. Averill,
BY
ATTORNEY

Patented Mar. 6, 1934

1,949,855

UNITED STATES PATENT OFFICE 1,949,855

WEIGHING DEVICE

Earl A. Averill, Scarsdale, N. Y.

Application April 18, 1930, Serial No. 445,359

1 Claim. (Cl. 265—40)

My invention relates to weighing devices of the type particularly designed to indicate the weights of a plurality of loads having common supporting means, such for example as the loads of fuel and water carried in a locomotive tender, and is in the nature of an improvement on my prior Patent #1,606,333 granted to me November 9th, 1926.

Figure 1:
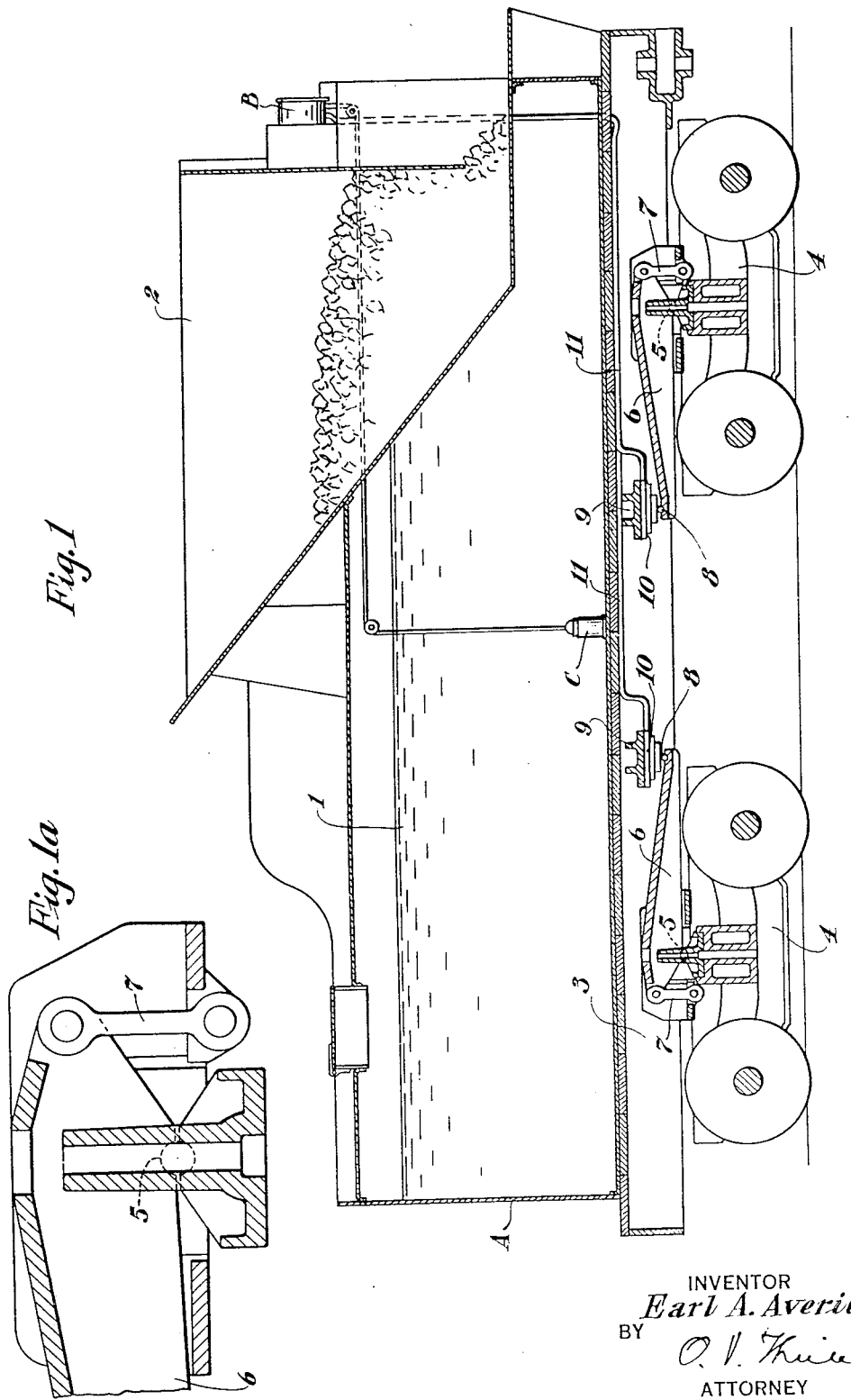
Figure 2:
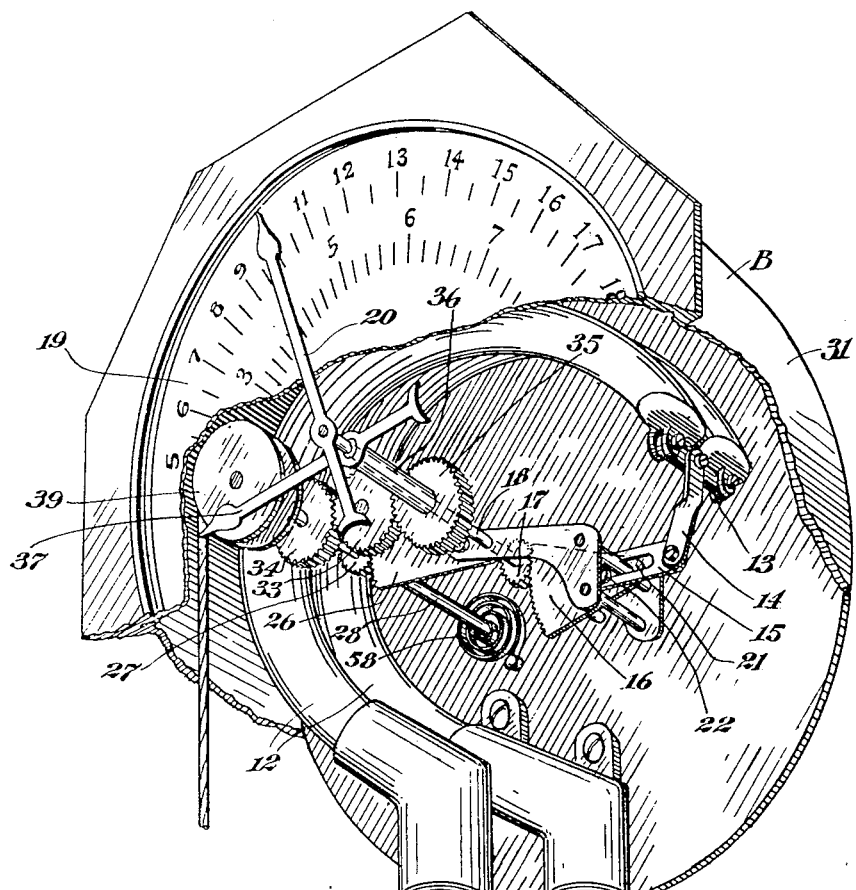
Figure 2A:
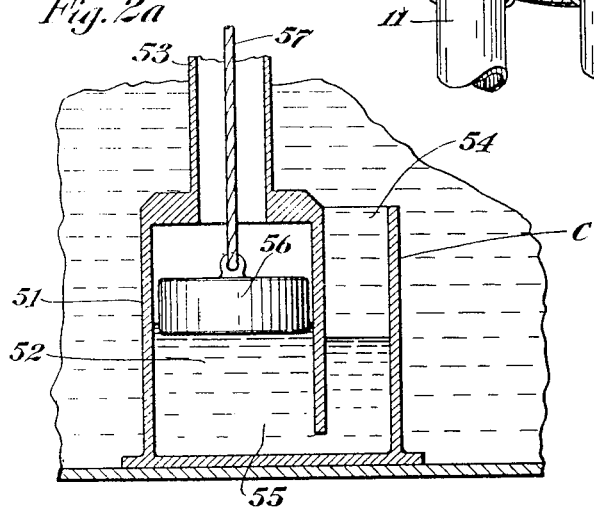
Figure 5:
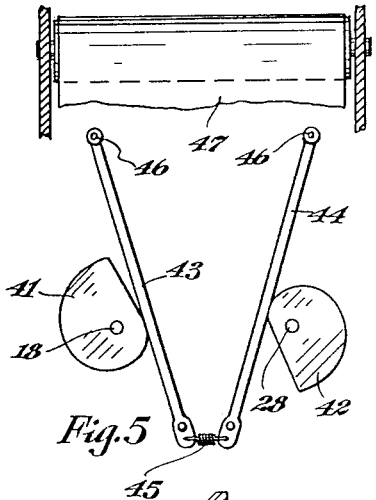
Figure 4:
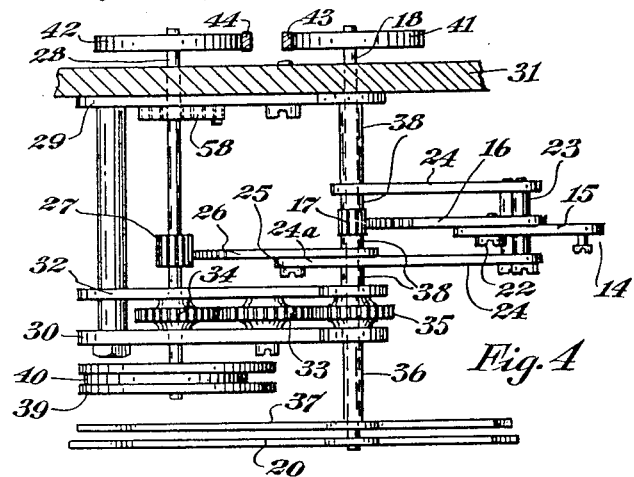
Figure 3:
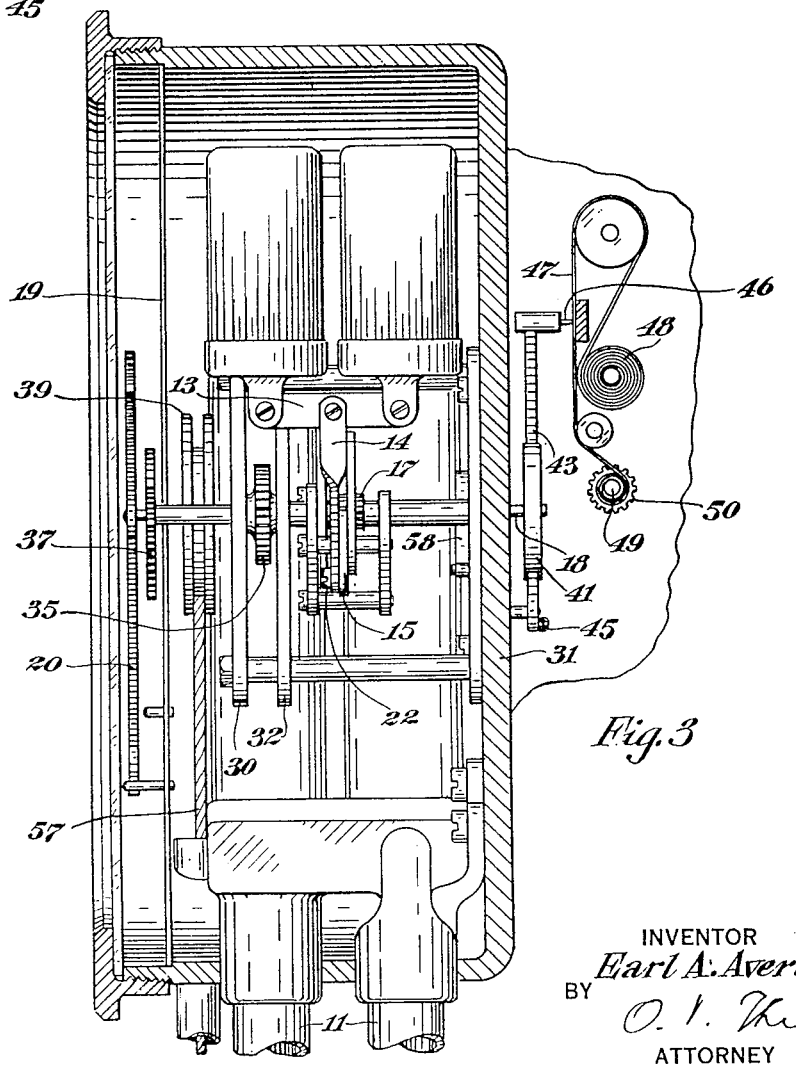

In the aforementioned patent the weights of the fuel and water in the locomotive tender are indicated on a gauge having a fixed and a movable dial, which, in cooperation with the mechanism of the gauge indicate separately the respective weights of the fuel and water carried. This apparatus, while operative for the purpose intended, is possessed of certain inherent limitations which prevent the indicating scales from being arranged in the most advantageous manner, and the present invention has for its principal object the provision of an improved form of indicating gauge for accomplishing the same general function performed by the earlier arrangement. It is a further purpose of the invention to provide a gauge adapted to cooperate with a recording mechanism so that a continuous record over a protracted period of time may be obtained of the weights of the bodies to be determined. Other and more specific purposes of the invention may best be understood from the ensuing description of a preferred form of apparatus illustrated in the accompanying drawings forming a part hereof in which Fig. 1 is a diagrammatic vertical section through a locomotive tender equipped with apparatus embodying the invention; Fig. 1a is an enlarged sectional detail view of the arrangement immediately above the tender truck; Fig. 2 is a perspective view on an enlarged scale of a gauge embodying the invention, certain parts being broken away and others omitted for the sake of clearness; Fig. 2a is a section on an enlarged scale of a portion of the apparatus cooperating with the gauge; Fig. 3 is a vertical section through the gauge taken at right angles to the face thereof; Fig. 4 is a fragmentary plan view of a portion of the gauge mechanism, and Fig. 5 is a fragmentary elevation of a portion of the recording mechanism shown in Fig. 3.

Referring now to Fig. 1 the locomotive tender A is shown as comprising a tank compartment 1 for water and a compartment 2 for fuel, both of said compartments being mounted on a common frame 3. Tender trucks 4 are each provided with transverse pivots 5 upon which rest levers 6, the latter being pivotally connected at one end by means of links 7 to tender frame 3 while at their other ends they support through suitable transverse pivots 8 the members 9 forming a part of the tender frame 3. Between the pivots 8 and the frame members 9 are located diaphragm chambers 10 which may be of the form disclosed in my prior patent above referred to. Each of these chambers contains a liquid which is carried through pipes 11 to the gauge B.

At the bottom of the water compartment 1 of the tender there is located a water level indicating device C which cooperates with B and which will be referred to in detail later.

Referring now to the construction of the gauge as shown in Figs. 2 to 4, the conduits 11 terminate in a pair of Bourdon tubes 12 which at their outer or free ends are connected by means of the transverse link 13, in the exact center of which is pivoted link 14 connecting link 13 with an arm 15 of gear segment 16, the latter meshing with gear 17 mounted on shaft 18. Shaft 18 extends through the face 19 of the gauge and has mounted on its forward end the indicator 20.

Arm 15 is slotted as at 21 and is adapted to be adjustably secured in fixed relation to segment 16 by means of the set screw 22, the segment 16 being pivotally mounted on the transverse pin 23 forming part of a frame comprising side members 24 pivoted on the same axis as shaft 18. Pin 23 extends through slot 21 and it is obvious that the arm 15 and segment 16 form a rigid unit pivotally movable about pin 23 as an axis.

One arm 24 of the movable frame is extended as at 24a and the extended portion thereof is secured by means of a screw 25 to the gear segment 26 which is also pivotally mounted on a bearing having the same axis as shaft 18.

Segment 26 meshes with gear 27 mounted on a second transverse shaft 28 which is rotatably mounted in the bearing plates 29 and 30, the latter being rigidly mounted within the gauge casing 31. Supplementary bearing plate 32, together with plate 30, forms a support for an idler gear 33 which connects a gear 34 secured on shaft 28 to gear 35 which is rigidly secured to a sleeve 36 around shaft 18. A second indicator hand 37 is secured to sleeve 36. Shaft 18 is surrounded by a number of loose sleeves or collars 38 which serve to hold the members 24 in properly spaced relation along the length of shaft 18.

The forward end of shaft 28 extends through plate 30 and has mounted thereon the pulley or cam 39 preferably grooved as at 40. The purpose of this cam will be explained later. To the shaft 28 is also secured one end of the coiled spring 58, whose other end is fixed to plate 29. Both shafts 28 and 18 extend through the back of casing 31 and have secured to their extended ends the cams 41 and 42 which actuate respectively the pivoted levers 43 and 44. These levers are held in contact with the cam faces by means of the spring 45, and each lever carries at one end a pin or stylus 46 adapted to make a record upon the paper 47 which is moved continuously from roll 48 to roll 49 by means of any suitable clock work or similar driving mechanism (not shown) operating through gear 50.

Referring now to Fig. 2a, the mechanism C comprises a casing 51 set in the bottom of the water compartment of the tender. Casing 51 forms a cylinder 52 communicating with the space above the water compartment through pipe 53, and a chamber 54, the latter opening at its top into the water compartment and communicating at its lower end with the bottom of cylinder 52. The casing 51 contains a quantity of liquid 55 having a high specific gravity, preferably mercury, which sustains a float 56 connected by means of a suitable cord or cable 57 with the cam 40. The apparatus C just described is a single form of hydrostatic water level indicator which because of the high specific gravity of the liquid 55 materially reduces the amount of travel of float 56 for a given rise or fall in water level in compartment 1. It is to be noted that because of the high specific gravity of the liquid 55 a relatively heavy float 56 may be used to counter-balance the action of the coil spring 58 acting on shaft 28 to rotate it as the float is lifted.

The operation of the device is as follows: A fixed proportion of the total weight of the tender and its load is transmitted to the diaphragms 10 and as these with the pipes 11 and Bourdon tubes 12 form closed systems containing a substantially incompressible liquid, a change in weight produces no appreciable movement. This eliminates all friction due to movement, and the pressures existing within the Bourdon tube systems are, therefore, an accurate reflection of the total tender weight. By linking the free ends of the Bourdon tubes together, movement of link 14 reflects the total tender weight and assuming that weight is added to the tender the expansion of the Bourdon tubes will lift link 14 to move segment 16 in counter-clockwise direction, viewed from the front, and gear 17 and indicator 20 in clockwise direction. The above action will, however, be influenced by the position of transverse pivot pin 23 and the position of this pin with respect to shaft 18 is controlled by the float actuated cam 39. Suppose, for example, both coal and water are added to the tender, the increase in total weight will tend to move indicator 20 in clockwise direction as described, but the addition of water raises the water level in compartment 1 which in turn causes float 56 to rise. The lifting of float 56 enables spring 58 to turn shaft 28 in clockwise direction and this movement through gear 27 moves segment 26 and the arms 24 carrying pivot 23 in counter-clockwise direction so that the upward movement of link 14 due to the water component of the total added weight is neutralized by the corresponding upward movement of pivot 23 effected by the change in water level due to the addition of water. In other words, the pivoted mechanism 23, 24 and 26 constitutes a compensating mechanism which neutralizes the effect of the weight of the water on the Bourdon tube systems so that the weight of water is automatically subtracted from the total weight which would otherwise be indicated by 20. In nearly all cases the tender compartment 1 is of irregular outline so that equal increments in water level do not represent equal increments in weight of the water, and this irregularity is preferably compensated for by so shaping the cam groove 40 that rotation of shaft 28 will be proportional to changes in the weight of the water in compartment 1 rather than to its variations in level. The same object may be achieved by using a symmetrical cam in conjunction with a level indicator having a body formed in the manner disclosed in U. S. Patent #1,680,103 granted to C. R. Hardy on August 7, 1928.

Rotation of shaft 28 in clockwise direction by the addition of water will cause a corresponding clockwise rotation of the indicator head 37 through the medium of gears 33, 34 and 35 and this movement will always be directly proportional to the weight or volume of water added to or taken from the compartment 1.

From the above it will be evident that the weight of coal in the tender is secured by obtaining the total weight through the Bourdon tube systems and subtracting from it through the compensating mechanism the weight of the water as determined through its volume, so that indicating hand 20 records only the weight of the coal while the indication with respect to the water in the tender is obtained through mechanism responsive to volumetric changes in the water. Obviously in the calibration of the gauge scales the instrument is initially set to compensate for the empty weight of the tender.

The operation of the recording mechanism provided is more or less obvious, as rotation of the shafts 18 and 28 actuates the cams 41 and 42 to move the pens 46 transversely of the recording paper which is provided with a suitable scale to give a continuous record of the weights of coal and water carried in the tender over a given period of time.

While in accordance with the patent statutes I have shown a preferred form of mechanism for carrying the invention into effect, it is to be understood that it is illustrative only and that all such changes and modifications are intended to be covered as may fall within the scope of the appended claim.

I claim:

Apparatus for weighing a plurality of variable loads at least one of which is a liquid, comprising in combination weighing means responsive to changes in the combined weights, said means comprising a movable pivot and a member mounted to oscillate about it, a float arranged to rise and fall with the level variations of the liquid, and mechanism operatively connecting the float with the pivot to move it proportionally to changes in the level of the liquid, the arrangement being such that the amount and direction of the movement of the pivot will substantially neutralize the effect of variations in the weight of the liquid load on the weighing means, whereby the weighing means indicates variations exclusive of those in the liquid load.

EARL A. AVERILL.